T. A. ANDREWS & A. G. EDWARDS.
Bale-Tie.
No. 199,678. Patented Jan. 29, 1878.
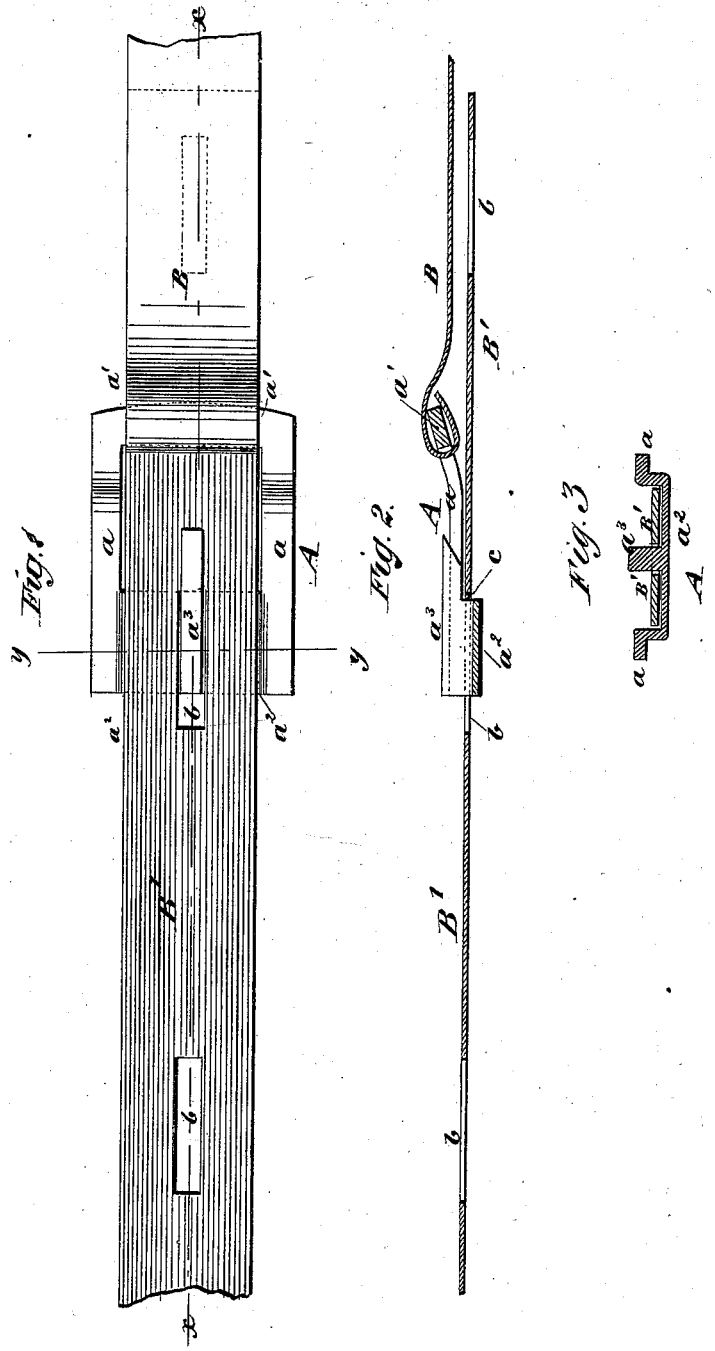
WITNESSES:
Francis McArdle
J. H. Scarborough.
INVENTOR:
T. A. Andrews.
A. G. Edwards.
BY Munn & Co
ATTORNEYS.

UNITED STATES PATENT OFFICE.

THOMAS A. ANDREWS AND ALFRED G. EDWARDS, OF GAINESVILLE, TEXAS.

IMPROVEMENT IN BALE-TIES.

Specification forming part of Letters Patent No. 199,678, dated January 29, 1878; application filed November 30, 1877.

*To all whom it may concern:*

Be it known that we, THOS. A. ANDREWS and ALFRED G. EDWARDS, of Gainesville, in the county of Cooke and State of Texas, have invented a new and Improved Bale-Tie, of which the following is a specification:

The invention will first be described in connection with the drawings, and then pointed out in the claim.

In the accompanying drawing, Figure 1 represents a plan view of our improved bale-tie. Fig. 2 is a longitudinal section of the same, taken on the line $x\ x$ of Fig. 1. Fig. 3 is a cross-section on the line $y\ y$ of Fig. 1.

Similar letters of reference indicate corresponding parts.

A is an oblong plate, open in the center, and having the appearance of the frame of an ordinary buckle. The side bars $a$ of the buckle-frame A are bent so as to raise the end bar $a^1$, for securing thereto the end B of the bale-band in a position sufficiently high to allow of the two ends of the bale-band lapping each other, as shown in Fig. 2. The other end bar, $a^2$, of the buckle-frame is made broad, and sunk or recessed, as shown in Fig. 3, for the reception of the free end B' of the bale-band, which latter is provided with central slots or perforations $b$, made at intervals, for adjustment.

On the middle of the end bar $a^2$ of the frame A, and formed in one piece with it, is the catch $a^3$, projecting from the end bar $a^2$ on the whole breadth thereof, and reaching beyond it so far as about half of the opening in the frame A, where its upper straight surface terminates at its forward end with an edge, the point of the catch $a^3$ being wedge-shaped, as shown in Fig. 2. The under side of the catch $a^3$ is cut away sufficiently at $c$ to give room between the same and the bottom of the recess in the end $a^2$ of the frame for the thickness of the bale-band.

The bale-band, secured with one end to the buckle, having been placed around the bale, the free end B' is inserted over the catch $a^3$ through the opening in the frame A, and slipped on the catch to lodge in the recess of the end $a^2$ of the frame, the catch $a^3$ entering one of the slots $b$ in the band in the position shown in the drawing. The bale is allowed to expand and the tie is tightened, with its ends B B firmly secured together.

Having thus described our invention, we claim as new and desire to secure by Letters Patent—

A bale-tie whose frame A is provided with an end bar, $a^2$, having wedge-shaped catch $a^3$, cut away at $c$, as and for the purpose specified.

THOS. A. ANDREWS.
ALFRED G. EDWARDS.

Witnesses:
B. D. DAVIDSON,
W. L. BLANTON.